United States Patent Office 3,176,881
Patented Apr. 6, 1965

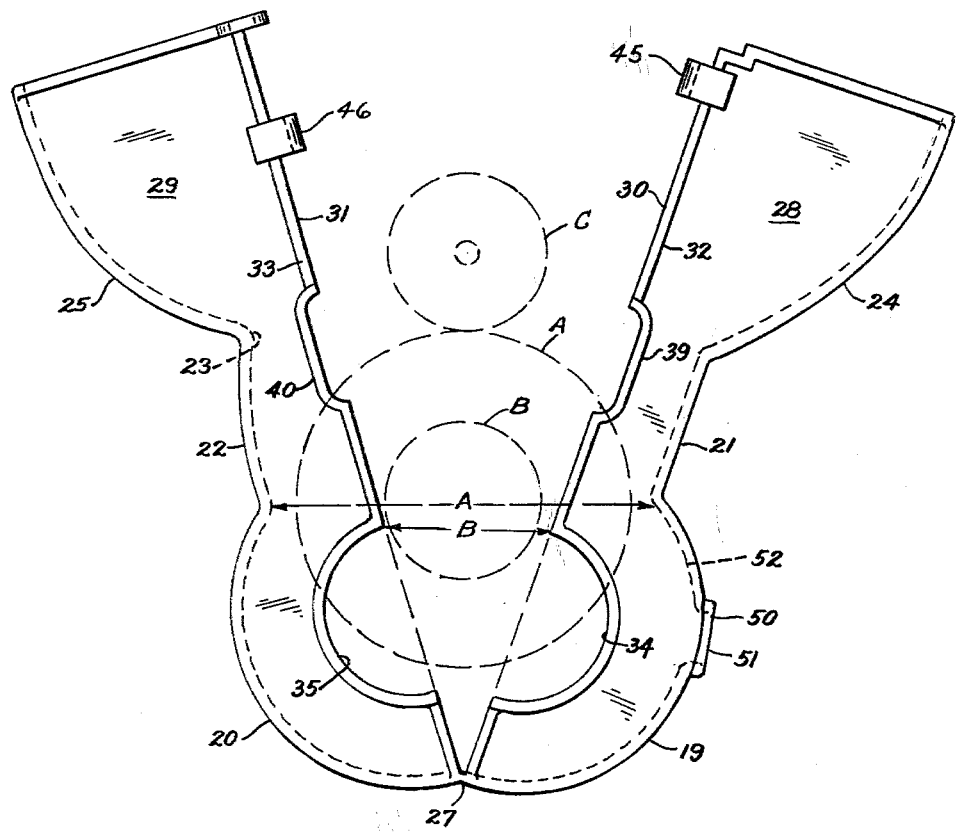

3,176,881
MOLDED HOUSING FOR FERTILIZER AND
SEED SPREADER
Howard S. Malby, Westfield, and Fred M. Recknagel, Clark, N.J., assignors to California Research Corporation, San Francisco, Calif., a corporation of Delaware
Filed May 9, 1963, Ser. No. 279,173
11 Claims. (Cl. 222—177)

This invention relates to apparatus for spreading granular materials on the earth, and particularly refers to a molded unitary housing of a plastic material, e.g., polypropylene, for a lightweight spreader which may be traversed manually over a small area of earth to spread particulate material such as granular fertilizer, seeds or the like at a controlled and uniform rate of application.

Broadly speaking the invention is characterized by the provision of a unitary housing which is flexibly hinged to be secured around a pair of parallel, resilient faced rollers of different diameters, the larger driving the smaller by line contact therewith and having traction wheels for engaging the earth to rotate both rollers. The smaller roller cooperates with a portion of the housing to regulate the flow of granular material to the nip of the contacting resilient roller faces into which the granular particles are temporarily impressed and subsequently released from the larger roller and thence passed out through one or more ports in the housing, which is traversed by any suitable means over the area to be covered.

Among the objects of the invention are included:

(1) To provide an improved unitary molded housing means for a spreader for particulate or granular solid materials such as fertilizer or seeds.

(2) To provide an improved housing that may be economically fabricated by molding or forming techniques from plastic materials such as polypropylene, so as to provide in one unit a hopper, a metering element, particle distributing roller support and axle housing.

(3) To provide a housing of inert noncorrosive materials that may be readily cleaned by simple flushing with water.

(4) To provide a simple means for assembling and for fastening together a housing of this type.

(5) to provide a unitary molded blank of material that may be assembled around the internal mechanism of a spreader or the like and subsequently secured together by simple means, which may be readily removed for replacement of parts subject to wear or deterioration.

(6) To provide an improved apparatus involving a resilient faced roller into which granular material may be impressed by compression and subsequently released by controlled expansion.

These and other objects and advantages will be further apparent from the following description of a preferred embodiment of the invention, taken in conjunction with the attached drawings, which form a part of this specification.

In the drawings:

FIGURE 4 is an end elevational view of the unitary molded housing alone, with its side walls temporarily spread apart to receive the larger and smaller internal rollers and the shafts on which they rotate.

Figure 1:
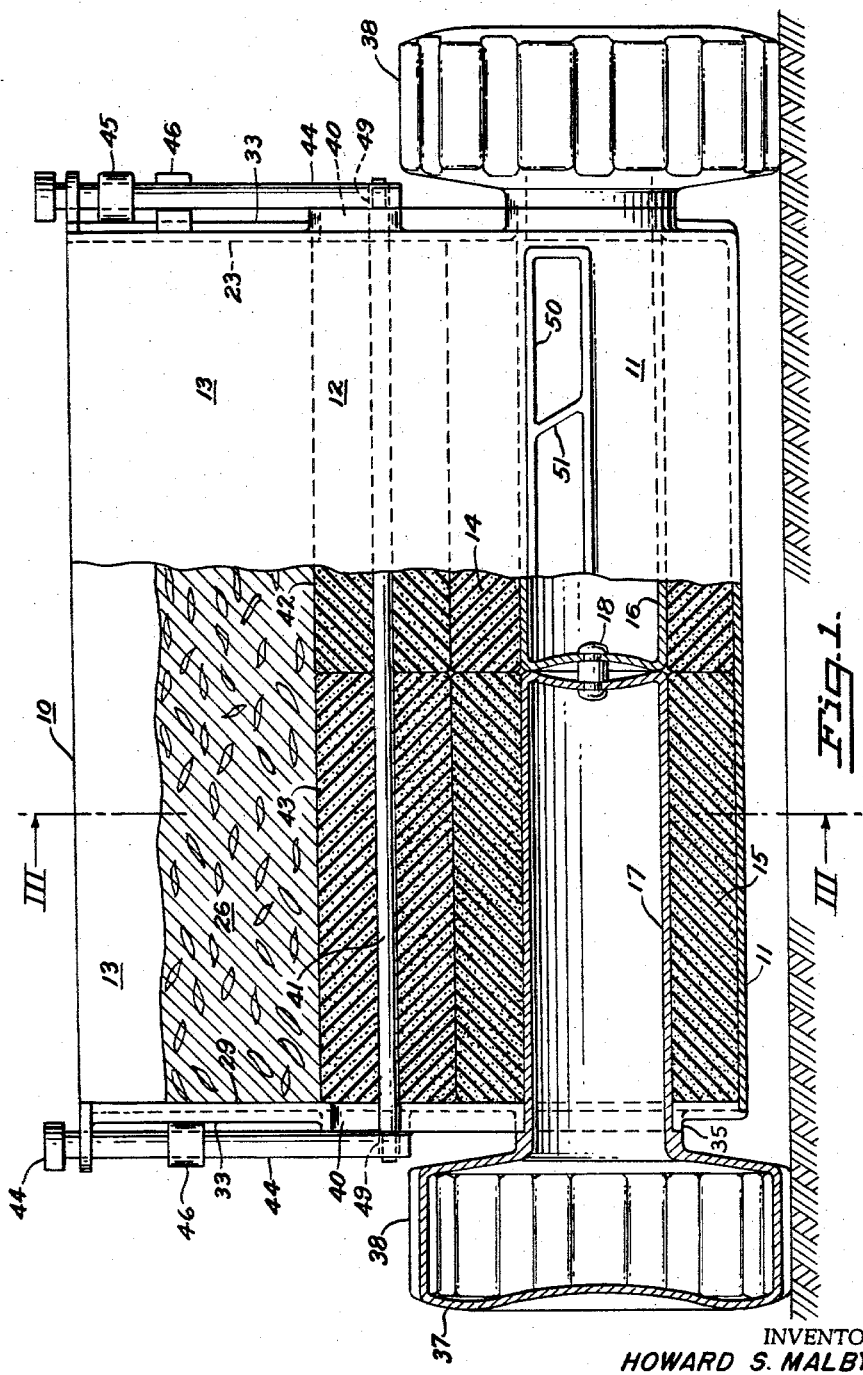
FIGURE 1 is a side elevational view, partially in section, of an assembled spreader unit utilizing the molded housing of this invention.
Figure 2:
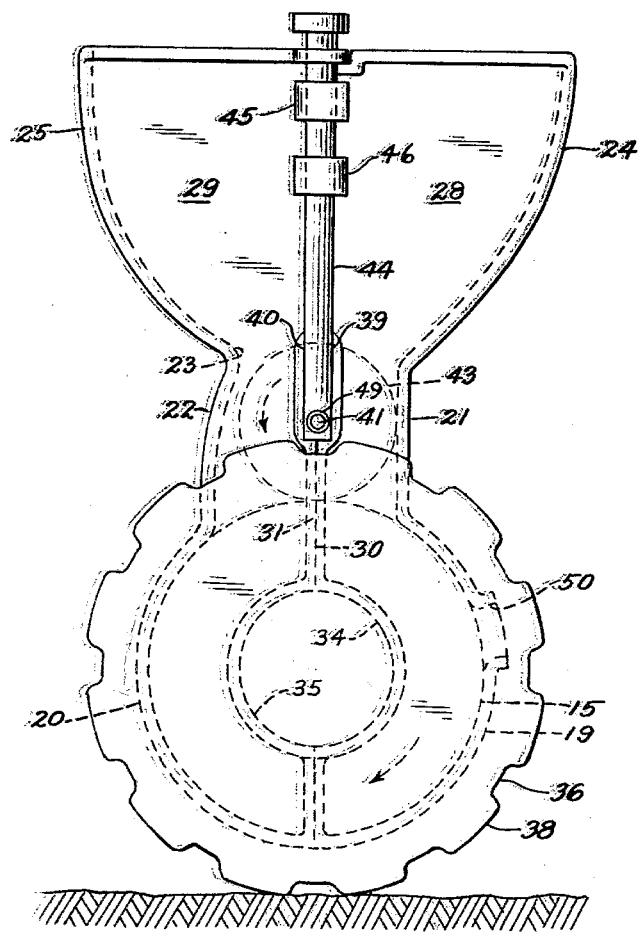
FIGURE 2 is an end elevational view of the spreader of FIGURE 1.
Figure 3:
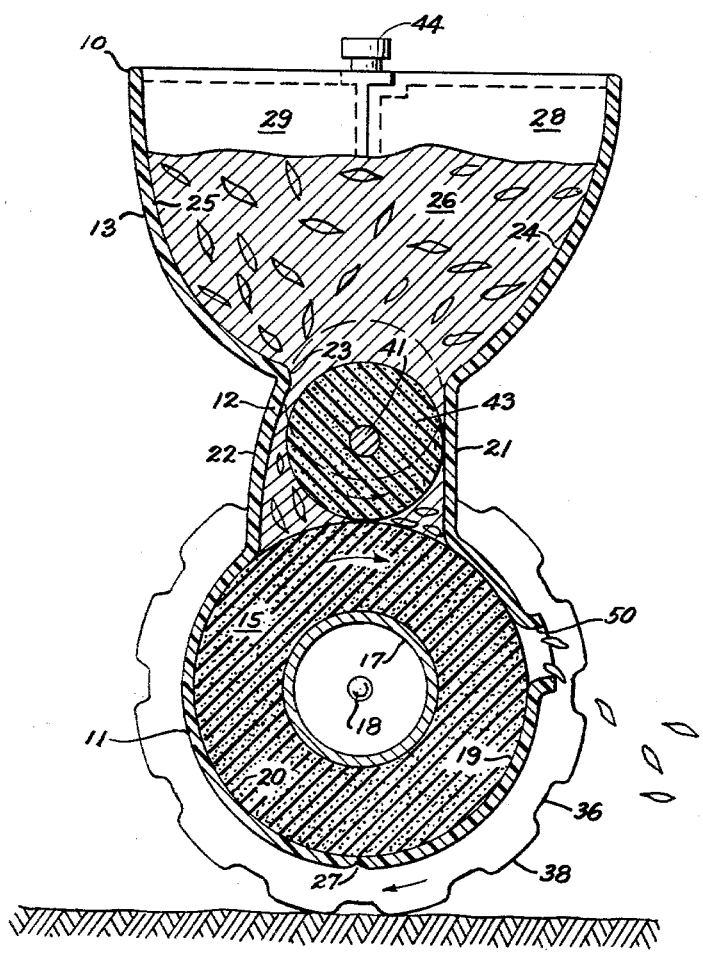
FIGURE 3 is a vertical sectional view taken on line III—III of FIGURE 1.

Referring to the drawing and particularly FIGS. 1 and 2, the reference numeral 10 designates generally the unitary molded housing consisting essentially of three sections, viz., the lower hollow cylindrical section 11, an intermediate narrow section 12 and an upper diverging section 13, all interconnected and desirably formed of thin walls of molded plastic, e.g. polypropylene. A pair of longitudinally aligned, resilient faced rollers 14 and 15 enclosing hollow shafts 16 and 17, preferably with the latter rotatably joined at their abutting end faces by an axially positioned double headed rivet 18, are enclosed snugly but rotatably by the opposed concave walls 19 and 20 of section 11. The resilient faces of said rollers may be of sponge rubber or foamed plastic, with a smooth but deformable outer surface.

Above concave walls 19 and 20 are relatively narrow opposed walls 21 and 22, the first substantially straight and the latter converging slightly inwardly toward the former at its upper edge to form a lip 23, for a purpose to be described in more detail below. Above opposed walls 21 and 22, the housing diverges outwardly at 24 and 25 to form a storage hopper or chamber for the granular or particulate material 26 to be handled. In this illustrative example, the walls 24 and 25 are curved, but may equally well be V-shaped or any other configuration that will both preserve the general form of lip 23 and feed the particles 26 to the narrow throat between the upper edges of walls 21 and 22.

The bottom of the hollow cylindrical section 11, where the opposed lower side walls 19 and 20 join, is provided with an outer longitudinal shallow groove 27 which results in a thin section of the unitary housing 10 that is flexible enough to form a hinge so that the side walls may be spread apart temporarily as shown in FIG. 4.

Each end of each side wall of sections 11, 12 and 13 is integrally molded with one-half of a vertically split end wall at right angles thereto, reference numeral 28 indicating that one connected to side walls 19, 21 and 24, and reference numeral 29 indicating that one connected to the side walls 20, 22 and 25, respectively. The mating faces 30 and 31 of the end walls 28 and 29 are desirably provided with reinforcing flanges 32 and 33 and, additionally, are notched or recessed as shown in FIG. 4, and these will now be described.

Coaxial with the center of lower hollow cylindrical section 11 there are formed in end walls 28 and 29 complementary semicircular recesses 34 and 35, to receive the outer ends of roller shafts 16 and 17, which project out of the housing 10 and terminate in driving wheels 36 and 37, respectively, each having radial serrations or lugs 38 to facilitate turning the wheels and rollers when the housing traverses slippery surfaces such as wet grass.

Above recesses 34 and 35 are a pair of elongated notches 39 and 40 to receive a solid shaft 41 for a pair of smaller upper rollers 42 and 43 to be independently rotatable and which may be designated metering rollers. Notches 39 and 40 permit shaft 41 and these rollers to be lowered and very tightly pressed against rollers 14 and 15 so that their resilient surfaces are deformed and flattened. Also, they may be raised to intermediate positions so as to meter materials through the spreader while lying lightly on rollers 14 and 15 but still in sufficient frictional contact to be rotated. The shaft may also be raised to its upper position where rollers 42 and 43 are free of rollers 14 and 15 and are in contact with lip 23 so as to prevent the materials in storage hopper or chamber from being passed to the lower dispensing portion of the spreader.

Adjustment, as well as support for the outermost ends of shaft 41 and rollers 42 and 43, is provided by a vertical rod 44 at each end of housing 10. Rod 44, in this example, also serves to secure together the two halves of end wall members 28 and 29 by engagement with inwardly recurved lugs 45 and 46. The uppermost lug 45 is on a transverse projection from the end of half wall 28 and extends across the center line of the end walls. Similarly, the lower lug 46 is on a transverse projection from half wall 29 extending in the opposite direction from lug 46 and across the center line of the end walls. When rod 44 is pushed downwardly to the position shown in FIGURE 2, it acts as a key or latch in cooperation with lugs 45 and 46 to secure the two half end walls 28 and 29 together. Furthermore, by the engagement of shaft 41 in a journal 49 in the lower end of the rod 44 the small rollers 42 and 43 are also supported on the rod 44. By the means just described, rollers 42 and 43 may be moved upwardly in the throat between intermediate side wall 21 and 22 and out of contact with rollers 14 and 15 to bridge the gap between the upper end of the intermediate side walls and the lip 23 at the top of wall 22.

Along lower side wall 19, as shown in FIGURES 1 and 2, are longitudinal outlet ports 50, desirably bridged by inclined segments 51 so that particulate material will be discharged uniformly along the length of housing 10 onto the surface over which it is traversed. Particles 26 which have been embedded in the resilient surface of rollers 14 and 15 are released at the outlet ports 50 as the compressed resilient face of the rollers expands to force the particles out through the ports.

Referring again to FIGURE 4, the dotted circles designated A, B and C designate, respectively, the large rollers 14, 15, shafts 16, 17 and small rollers 42, 43 in the position they will assume when the two halves of body 10 are spread apart while these internal parts are being installed or removed. The dual shafts 16 and 17 are separately rotatable by their respective driving wheels 36 and 37 due to the loose rivet 18, so that when one is moving faster than the other, as in turning corners, the wheels will not tend to skid or slip, and the feed of particulate material will be in proportion to the distance traveled. It is also contemplated, however, that both rollers 14 and 15 and rollers 42 and 43 could be unitary and not made in two independently rotatable parts. No handle or other support means on the housing are shown for this purpose, as it is well within the skill of this art to provide such means and they form no part of this invention.

In conclusion, it will be appreciated that many changes could be made from the illustrative structure shown and described herein without departing from the invention, and all such modifications that come within the scope of the appended claims are intended to be embraced thereby.

We claim:

1. A molded spreader for particulate or granular material, comprising a unitary pair of opposed lower concave side walls flexibly joined along their lower edges to form a longitudinal hinge, a pair of upper side walls diverging outwardly to form a storage chamber for said material, said upper side walls being connected along their lower edges to the upper edges of said lower walls by substantially flat intermediate side walls, each end of each side wall being integral with one side half of a vertically split end wall, means for securing together the halves of said end walls to form end closures for said spreader, a first pair of resilient faced rollers enclosed by said lower concave side walls, each roller having a shaft secured thereto and projecting out of one end wall and terminating in a driving wheel, a second pair of resilient faced rollers between said intermediate side walls and in contact with one of them, and adapted to be rotated by said first rollers to feed particulate material therebetween from said storage chamber, and means forming a longitudinal outlet in one lower side wall for said particulate material, whereby particulate material imbedded in said resilient faces of said first pair of rollers is discharged from said first pair of rollers at said longitudinal outlet.

2. A molded spreader according to claim 1 with the addition of means secured to said end walls for adjustably supporting said second-named rollers.

3. A molded spreader according to claim 1 in which said intermediate side walls converge upwardly and said second-named rollers are adjustable upwardly to close off the passage from said storage chamber formed by said intermediate side walls.

4. A molded spreader according to claim 1 in which each half end wall is provided with an outwardly projecting lug overlapping the other half, and said securing means comprises a rod passing between said lugs.

5. A molded spreader according to claim 4 in which said second-named rollers are provided with a single shaft extending outwardly from each end closure, the end of said shaft being journalled in said rod outwardly of the end walls of said spreader.

6. A molded spreader according to claim 5 in which said rod is slidable longitudinally of said end walls to adjust the relative spacing between said second-named rollers and said connection between the lower edges of said upper side walls and the upper edges of said lower walls.

7. A unitary molded housing for a particulate or granular material spreader or the like, comprising a pair of opposed lower concave side walls flexibly joined along their lower edges to form a longitudinal hinge, a pair of upper side walls diverging upwardly and connected along their lower edges to the upper edges of said lower walls by substantially flat intermediate side walls, each end of each side wall being integral with one side half of a vertically split end wall, said split extending outwardly from the hinged juncture of said lower concave side walls, a pair of overlapping lugs on said end walls adapted to retain end wall securing means to close the split halves, and means forming a longitudinal aperture in one of said lower concave side walls.

8. A housing according to claim 7 in which said last-named means comprises a series of longitudinally overlapping apertures extending substantially throughout the length of said lower side wall.

9. A unitary spreader for particulate or granular material comprising a unitary pair of opposed lower concave side walls flexibly joined along their lower edges to form a longitudinal hinge, a pair of upper side walls diverging outwardly to form a storage chamber for said material, said upper side walls being connected along their lower edges to the upper edges of said lower walls by substantially flat intermediate side walls, each end of each side wall being integral with one side half of a vertically split end wall, means for securing together the halves of said end walls to form end closures for said spreader, a resilient faced roller enclosed by said lower concave side walls, a shaft secured to said roller and extending out of said spreader, a driving wheel on each end of said shaft, a second resilient faced roller adjustably positioned between said intermediate side walls and adapted to be rotated by said first-named roller to feed said material therebetween from said storage chamber, and means in one of said concave lower side walls forming an outlet for said material.

10. A spreader according to claim 9 in which said intermediate side walls converge upwardly to form a throat, and said second-named roller is movable upwardly to close said throat to prevent said material from entering it from said storage chamber.

11. A spreader according to claim 9 in which one of said intermediate side walls converges upwardly to form a throat between said storage chamber and said second resilient faced roller, and said second resilient faced roller is movable upwardly to adjust the opening of said throat to meter the passage of said material from said storage chamber.

References Cited by the Examiner

UNITED STATES PATENTS 504,718  9/93  Franke _____ 222—414 X
2,237,504  4/41  Roath _____ 222—313

FOREIGN PATENTS 828,034  12/57  Great Britain.

LOUIS J. DEMBO, *Primary Examiner.*